US008306782B2

(12) United States Patent
Idemori et al.

(10) Patent No.: US 8,306,782 B2
(45) Date of Patent: Nov. 6, 2012

(54) SYSTEM FOR MONITORING AND DIAGNOSING REMOTE DEVICES

(75) Inventors: Kimito Idemori, Saitama (JP); Yoshikazu Ooba, Hachioji (JP); Katsuhiro Sumi, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 84 days.

(21) Appl. No.: 12/395,009

(22) Filed: Feb. 27, 2009

(65) Prior Publication Data

US 2009/0235119 A1    Sep. 17, 2009

(30) Foreign Application Priority Data

Mar. 11, 2008    (JP) ................................ 2008-061459

(51) Int. Cl.
*G06F 3/01* (2006.01)
*G06F 3/00* (2006.01)
*G06F 5/00* (2006.01)
*G06F 7/00* (2006.01)

(52) U.S. Cl. ......... 702/185; 702/183; 702/186; 702/188
(58) Field of Classification Search .................... 702/27, 702/56, 179, 181, 182, 184, 185, 187, 188; 345/716; 700/21; 701/33
See application file for complete search history.

(56) References Cited

U.S. PATENT DOCUMENTS

| | | | | |
|---|---|---|---|---|
| 6,567,709 | B1 * | 5/2003 | Malm et al. ...................... | 700/21 |
| 6,609,051 | B2 * | 8/2003 | Fiechter et al. ................. | 701/33 |
| 6,850,252 | B1 * | 2/2005 | Hoffberg ...................... | 715/716 |
| 7,809,529 | B2 * | 10/2010 | Ooba et al. ..................... | 702/188 |
| 2009/0013311 | A1 | 1/2009 | Ooba et al. | |
| 2009/0019319 | A1 | 1/2009 | Ooba et al. | |
| 2009/0204232 | A1 * | 8/2009 | Guru et al. ........................ | 700/9 |

FOREIGN PATENT DOCUMENTS

| | | |
|---|---|---|
| CN | 1417961 | 5/2003 |
| JP | 5-213553 | 8/1993 |
| JP | 2003-30161 | 1/2003 |
| JP | 2003-173207 | 6/2003 |
| JP | 2003-238041 | 8/2003 |
| JP | 2004-91140 | 3/2004 |
| JP | 2004-133553 | 4/2004 |
| KR | 2003-35181 | 5/2003 |

OTHER PUBLICATIONS

Notice of Reasons for Rejection for Application No. 2008-061459, Japanese Patent Office, mailed May 11, 2010.
Ooba et al.; "System for Remote Supervision and Diagnosis Using Mobile Program", U.S. Appl. No. 12/362,072, filed Jan. 29, 2009.
Notification for Filing Opinion issued in corresponding Korean Patent Application No. 10-2009-0014026, dated Oct. 25, 2010, pp. 1-4.
Notification of the First Office Action issued in corresponding PRC application No. 200910008304.1, dated Sep. 6, 2010, pp. 1-4.

* cited by examiner

*Primary Examiner* — Mohamed Charioui
*Assistant Examiner* — Felix Suarez
(74) *Attorney, Agent, or Firm* — Finnegan, Henderson, Farabow, Garrett & Dunner, L.L.P.

(57) ABSTRACT

According to one embodiment, a monitoring/diagnostic apparatus is provided, which is designed for use in a system for monitoring and diagnosing a plurality of object devices. The monitoring/diagnostic apparatus has an agent management module and a diagnostic module. The agent management module is configured to manage agents for collecting operation data of an object device. The diagnostic module uses the operation data collected, thereby to diagnose a problem in the objective device.

6 Claims, 8 Drawing Sheets

|  | a | b | c | t | h | g |
|---|---|---|---|---|---|---|
| T1 | a1 | b1 | c1 | t1 | h1 | g1 |
| T2 | a2 | b2 | c2 | t2 | h2 | g2 |
| T3 | a3 | b3 | c3 | t3 | h3 | g3 |
| T4 | a4 | b4 | c4 | t4 | h4 | g4 |
| T5 | a5 | b5 | c5 | t5 | h5 | g5 |
| T6 | a6 | b6 | c6 | t6 | h6 | g6 |
| T7 | a7 | b7 | c7 | t7 | h7 | g7 |
| T8 | a8 | b8 | c8 | t8 | h8 | g8 |

SYSTEM FOR MONITORING AND DIAGNOSING REMOTE DEVICES

CROSS-REFERENCE TO RELATED APPLICATIONS

This application is based upon and claims the benefit of priority from prior Japanese Patent Application No. 2008-061459, filed Mar. 11, 2008, the entire contents of which are incorporated herein by reference.

BACKGROUND OF THE INVENTION

1. Field of the Invention

The present invention relates to a system that has the function of monitoring and diagnosing various object devices installed in particularly remote places.

2. Description of the Related Art

In recent years, monitoring systems have been developed, which monitor various object devices, such as elevators, installed in remote places. A monitoring system of ordinary type has monitoring devices and communications lines. The monitoring devices are connected to the apparatuses to monitor. The communications lines are provided to achieve communication with the monitoring devices. In the monitoring system, the abnormality, the operation data about each object device monitored, collected by one monitoring apparatus, is received through communications lines. From the data thus received, abnormality, if existing in any device monitored, can be detected from the data thus received.

Monitoring/diagnostic systems have been proposed, each capable of not only detecting abnormality in any object device, but also diagnosing the problem in the object device. Such a system is disclosed in, for example, Jpn. Pat. Appln. KOKAI Publication No. 2003-238041. The system disclosed in this prior-art reference has a monitoring center that performs remote monitoring of elevators to collect information that may be used to make such a maintenance plan the users of the elevators can avoid damages and losses they may otherwise have if the elevators should stop operating due to an accident.

The monitoring center collects information from each monitoring device at regular intervals. The information includes the operation data and the component-replacement data, both concerning the object device monitored by the monitoring device. Using the information thus collected, the monitoring center performs a multivariate analysis on a degradation mode in which each elevator component operates until its lifetime expires. Based on the results of this analysis, the monitoring center calculates the best possible inspection interval. The analysis of the degradation mode uses various operation data items such as the load on each component, ambient temperature, humidity, operating speed, and rotations per unit time, and the like. More specifically, the parameter indicating the degradation of each component is extracted by means of multivariate analysis, the degradation tendency of the component is derived from the parameter extracted and the operation data, and an inspection interval optimal for the component is inferred from the degradation tendency. The optimal inspection interval thus obtained is utilized to formulate a maintenance plan.

In the conventional monitoring/diagnostic system, the monitoring center collects, at prescribed intervals, the operation data and the component-replacement data from the monitoring devices and some maintenance stations, and then infers, from these data items, the remaining part of the lifetime of every component of each object device monitored. Usually, the system needs to monitor many object device installed in remote places and to diagnose the object devices for possible problems in them. If so many object devices are monitored, how the operating state of each apparatus changes can hardly be detected quickly in order to diagnose the apparatus efficiently, particularly if the change is fast, merely by collecting the operation data and component-replacement data from each object device and by inferring the remaining lifetime thereof.

BRIEF SUMMARY OF THE INVENTION

An object of this invention is to provide a monitoring/diagnostic apparatus which is designed for use in a system for monitoring and diagnosing many object devices installed in particularly remote places, and which can monitor and diagnose each object device to cope with a fast change in the operating state of each object device.

A monitoring/diagnostic apparatus according to an aspect of this invention comprises: a communications module configured to perform data communication via a network with at least another apparatus for monitoring and diagnosing another object device; a data acquisition module configured to acquire operation data about the object apparatus; an agent management module configured to transmit an agent to the network and manage the agent, thereby to collect the operation data about the other object device from the at least another apparatus; a storage module configured to store the operation data acquired by the data acquisition module and the operation data collected by the agent; and a diagnostic module configured to perform a problem-diagnosis process by using the operation data stored in the storage module and to diagnose a problem in the object device on the basis of a results of the problem-diagnosis process.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described with reference to the accompanying drawings.

First Embodiment

Figure 1:
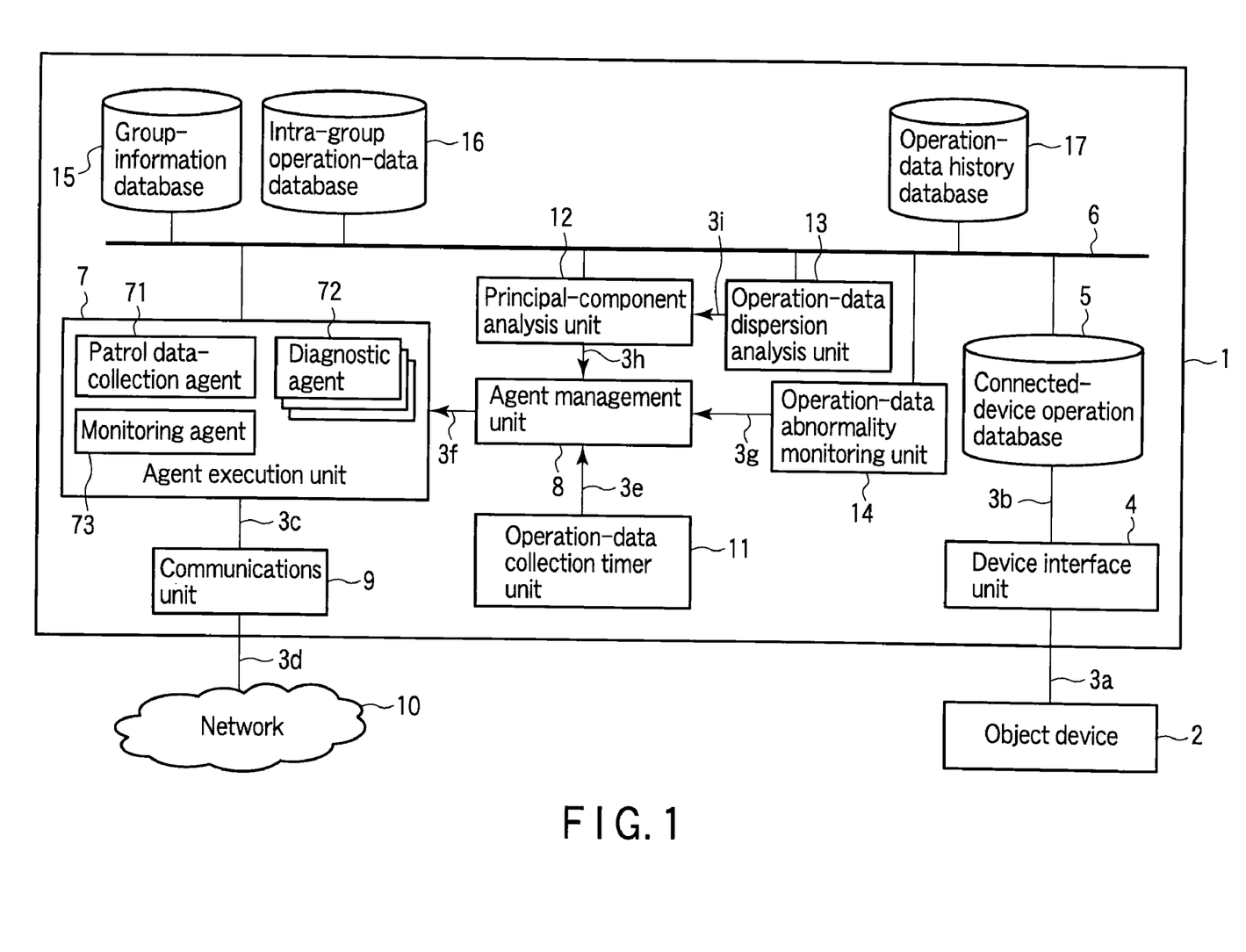
FIG. 1 is a block diagram showing the major components of a monitoring/diagnostic apparatus according to a first embodiment of the present invention.

FIG. 1 is a block diagram showing the major components of a monitoring/diagnostic apparatus according to the first embodiment of the present invention.

As shown in FIG. 1, the monitoring/diagnostic apparatus 1 has a device interface 4 and a communications unit 9. The device interface 4 is connected by a signal line 3a to a device 2 to be monitored and diagnosed (hereinafter referred to as "object device"). The communications unit 9 is connected by a signal line 3d to a network 10 such as the Internet. The object device 2 is a component of, for example, an elevator installed in a place remote from a monitoring center (not shown and described later).

The monitoring/diagnostic apparatus 1 further has a database 5 for holding connected-device operation data (hereinafter called a "connected-device operation database"), an agent execution unit 7, an agent management unit 8, an operation-data collection timer unit 11, a principal-component analysis unit 12 (hereinafter called "PCA unit"), an operation-data dispersion analysis unit 13, an operation-data abnormality monitoring unit 14, a group-information database 15, an intra-group operation-data database 16, and an operation-data history database 17.

The agent execution unit 7 incorporates a patrol data-collection agent 71, a diagnostic agent 72, and a monitoring agent 73. One of these agents 71, 72 and 73 is activated in accordance with a control signal 3f coming from the agent management unit 8. Note that these agents 71, 72 and 73 are program modules that can perform any designated function under self control.

Figure 2:
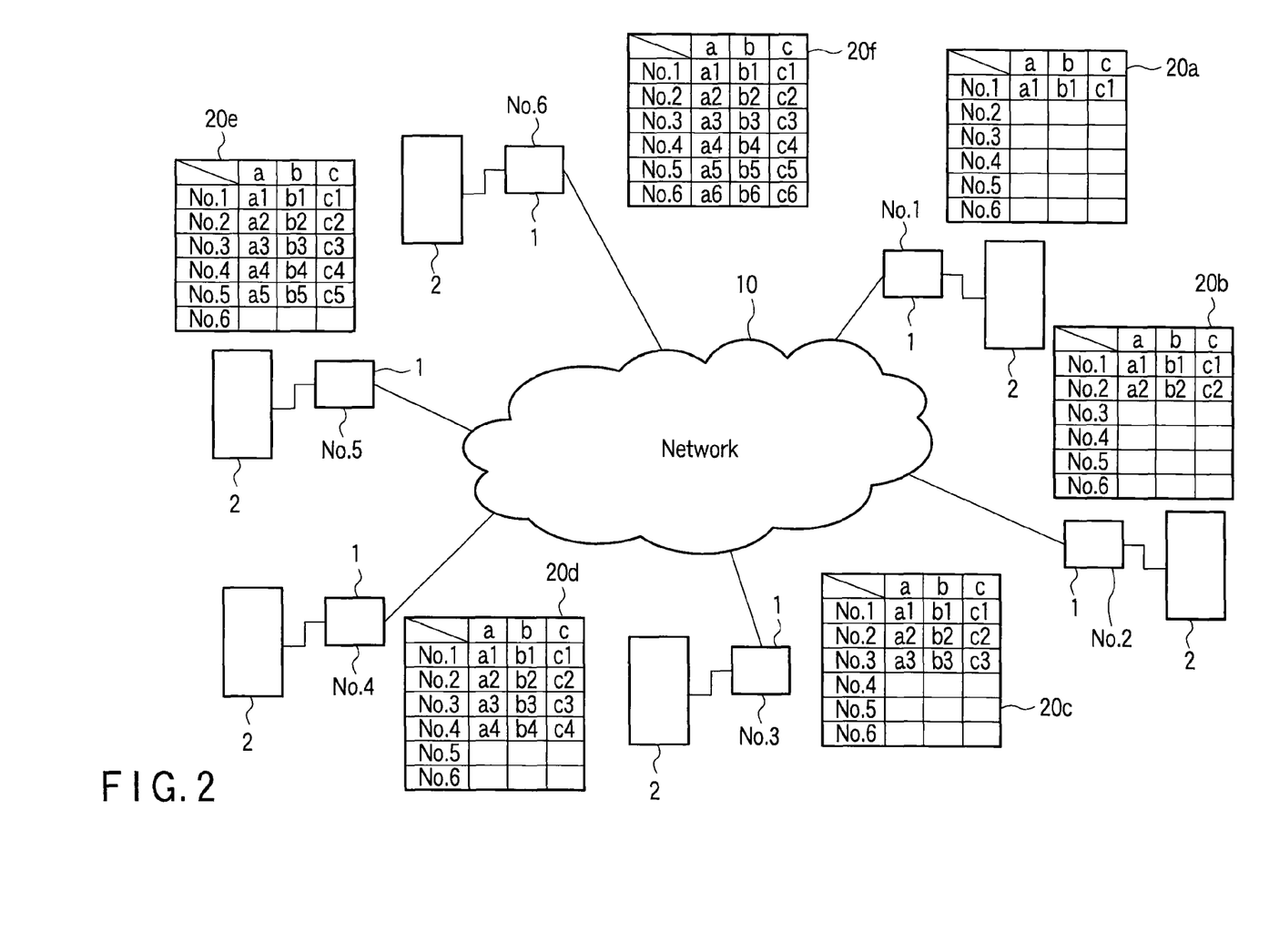
FIG. 2 is a block diagram showing the major components of a monitoring/diagnostic system according to the first embodiment.

FIG. 2 is a block diagram showing the major components of a remote monitoring/diagnostic system according to the first embodiment.

Figure 8:
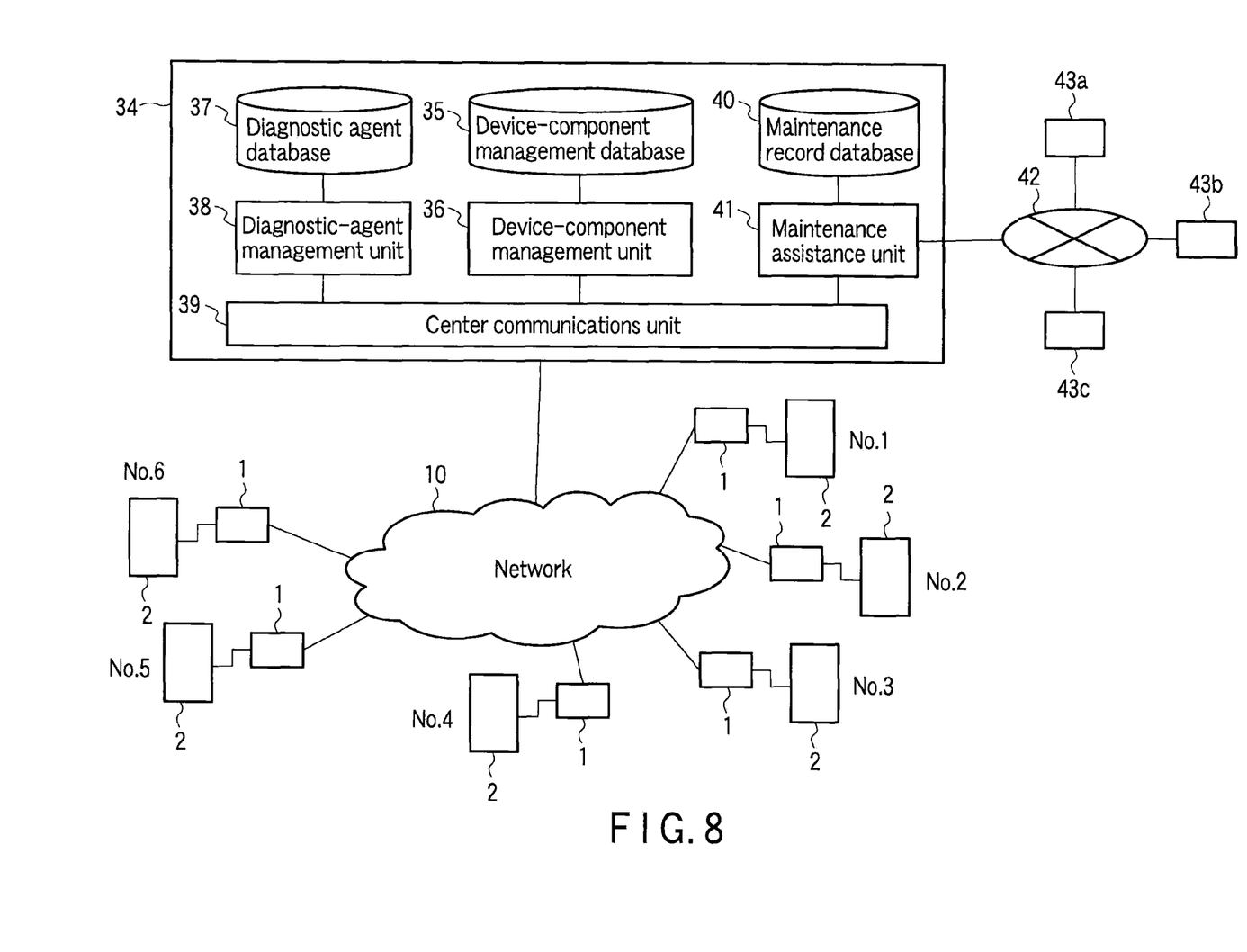
FIG. 8 is a block diagram showing the major components of a monitoring/diagnostic system according to a third embodiment of this invention.

The remote monitoring/diagnostic system comprises a plurality of monitoring/diagnostic apparatuses 1, a network 10, and a monitoring center 34. The monitoring/diagnostic apparatuses 1 are connected object devices 2, respectively. The object devices 2 are grouped in accordance with model or series. The network 10 connects the monitoring/diagnostic apparatuses 1. As shown in FIG. 8, the monitoring center 34 is connected to the network 10.

In this embodiment, each monitoring/diagnostic apparatuses 1 and the object device 2 connected to the apparatus 1 form a pair. The system of FIG. 2 has six pairs, which are assigned by symbols No. 1 to No. 6, respectively. The monitoring/diagnostic apparatus 1 shown in FIG. 1 belongs to pair No. 1.

(Operation and Advantages of the Apparatuses and System)

Figure 3:
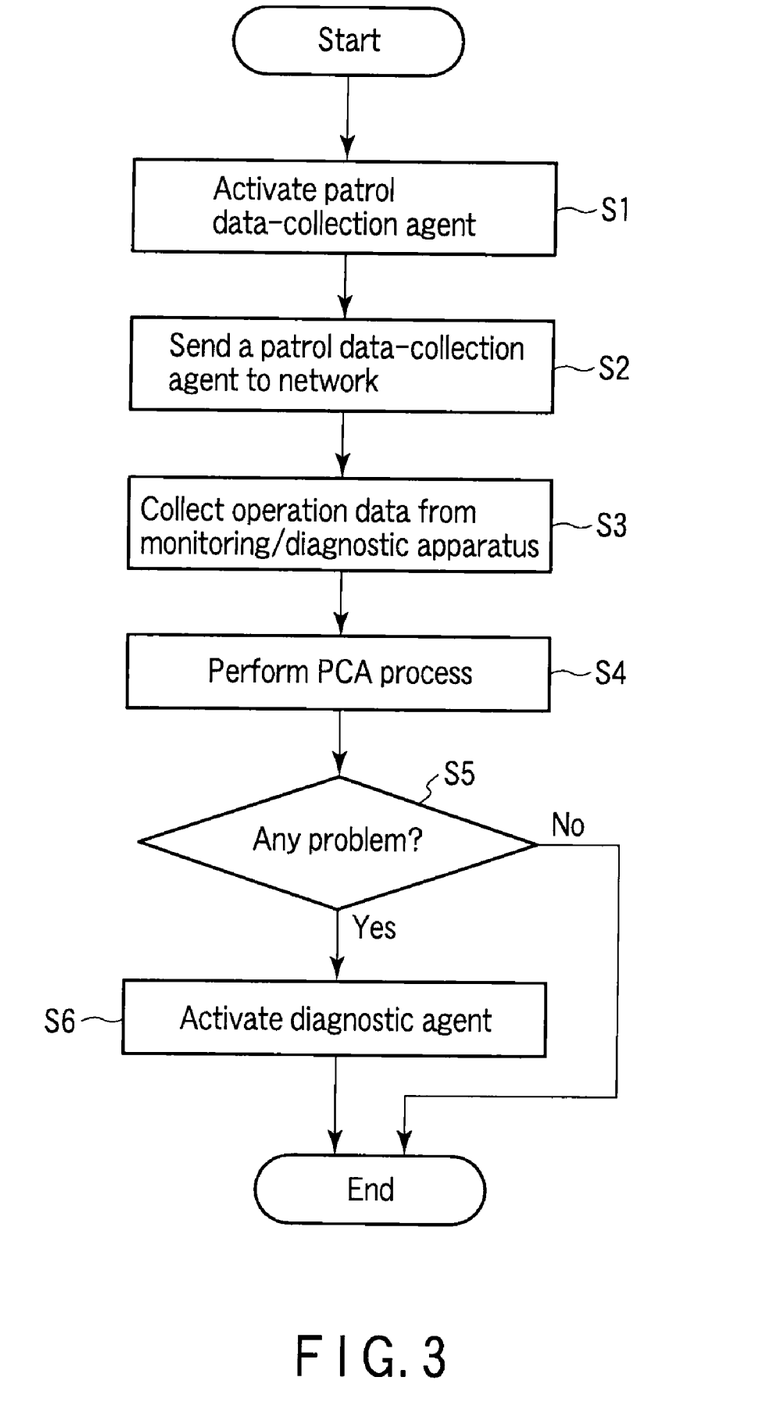
FIG. 3 is a flowchart explaining the operation of the monitoring/diagnostic apparatus according to the first embodiment.

The advantages and operation of this embodiment will be descried with reference to the flowchart of FIG. 3.

In each monitoring/diagnostic apparatuses 1, the device interface 4 receives operation data from the associated object device 2 at a specific timing. The operation data received is stored into the connected-device operation database 5 through a signal line 3b. The operation data includes the data detected by various sensors provided in the object device 2 and the operation history information about the object device 2.

The agent management unit 8 receives a data-collection activating signal 3e at regular intervals from the operation-data collection timer unit 11. Using the data-collection activating signal 3e, the agent management unit 8 activates the patrol data-collection agent 71 and the monitoring agent 73, both incorporated in the agent execution unit 7. The monitoring agent 73 takes the operation data from the connected-device operation database 5. The operation data is supplied from the communications unit 9 to the monitoring center 34 via the network 10.

As shown in the flowchart of FIG. 3, the agent management unit 8 activates the patrol data-collection agent 71 provided in the agent execution unit 7, in response to the data-collection activating signal 3e (Step S1). The agent execution unit 7 receives from the group-information database 15 the device-component information about the object devices 2 grouped in accordance with model or series. After receiving the device-component information, the agent execution unit 7 sends the patrol data-collection agent 71 to the network 10 (Step S2).

The patrol data-collection agent 71 can therefore identify each monitoring/diagnostic apparatuses 1 from which to collect data by patrol. That is, if sent from the monitoring/diagnostic apparatus 1 of the apparatus-device pair No. 1 to the network 10, the patrol data-collection agent 71 patrols the monitoring/diagnostic apparatuses 1 of the other apparatus-device pairs Nos. 2 to 6 as shown in FIG. 2. Similarly, the patrol data-collection agent 71 sent to the network 10 from the monitoring/diagnostic apparatus 1 of any one of the other apparatus-device pairs Nos. 2 to 6 patrols the monitoring/diagnostic apparatuses 1 of the other apparatus-device pairs.

The patrol data-collection agent 71 collects operation data items from the grouped monitoring/diagnostic apparatuses 1 and supplies these data items to the intra-group operation-data database 16 of the monitoring/diagnostic apparatus 1 (Step S3). Therefore, as shown in FIG. 2, in the monitoring/diagnostic apparatus 1 of the apparatus-device pair No. 1, the intra-group operation-data database 16 accumulates operation data items 20b to 20f collected by the monitoring/diagnostic apparatuses 1 of the apparatus-device pairs Nos. 2 to 6. In the monitoring/diagnostic apparatus 1 of the apparatus-device pair No. 1, the operation data item 20a about this apparatus 1 is stored in the connected-device operation database 5.

Figure 4A:
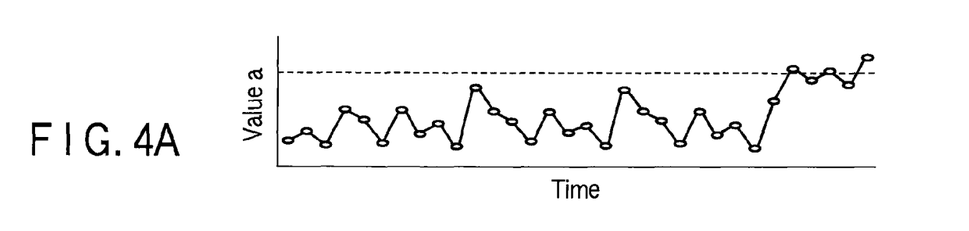
FIGS. 4A to 4C are diagrams illustrating exemplary operation data items acquired in the first embodiment.
Figure 4B:
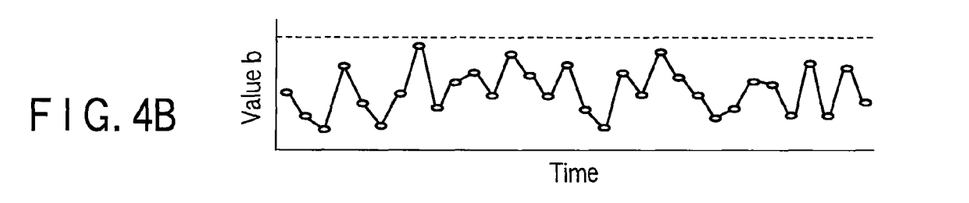
Figure 4C:
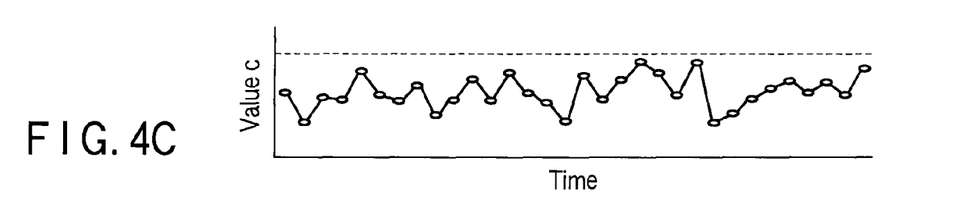
Figure 5A:
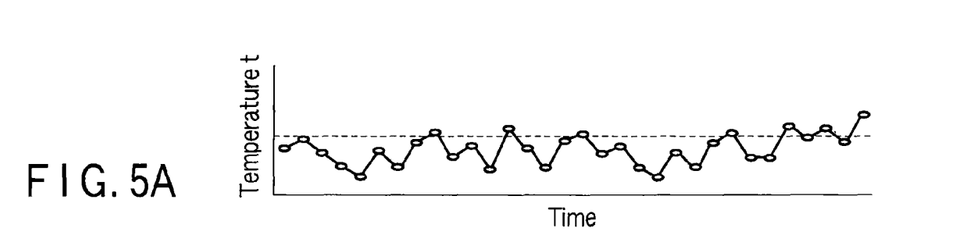
FIGS. 5A to 5C are diagrams illustrating other operation data items the first embodiment may acquire.
Figure 5B:
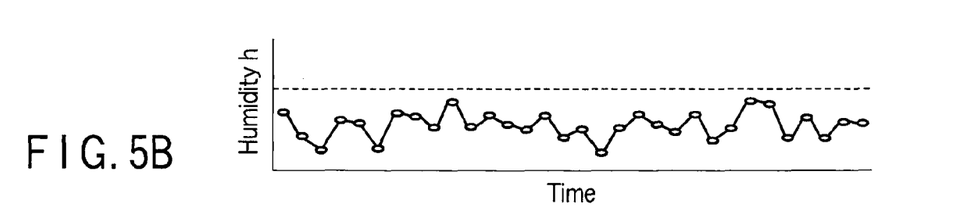
Figure 5C:
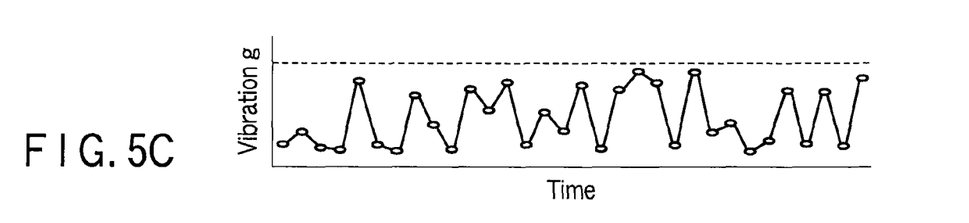

Each of the operation data items 20a to 20f includes such various measured values a to c as shown in FIG. 4A to 4C, respectively. Each of the operation data items 20a to 20f further includes environmental variables such as temperature t, humidity h and vibration g shown in FIG. 5A to 5C, respectively.

Figure 6:
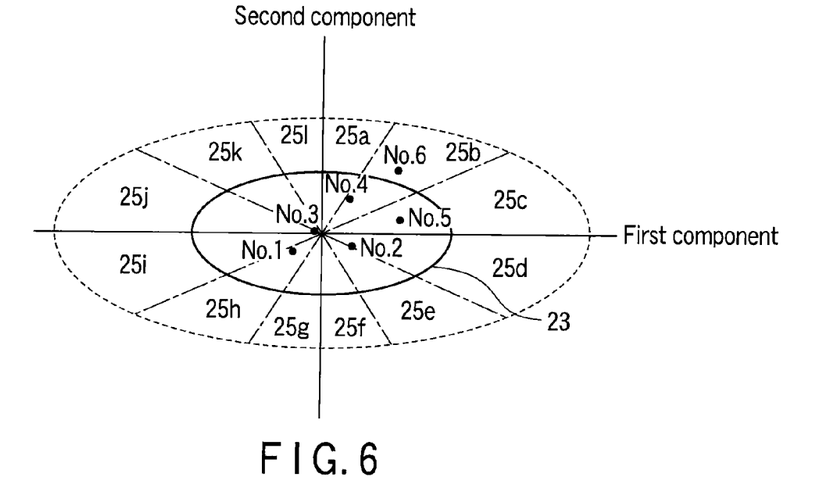
FIG. 6 is a diagram showing exemplary results of the PCA performed in the first embodiment.
Figure 7A:
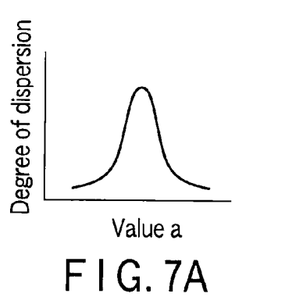
FIGS. 7A to 7F are diagrams showing various patterns of data dispersion, which are observed in the second embodiment.
Figure 7B:
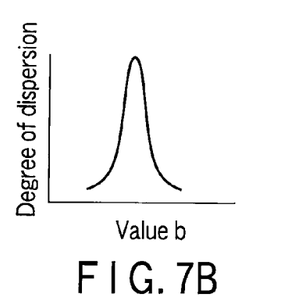
Figure 7C:
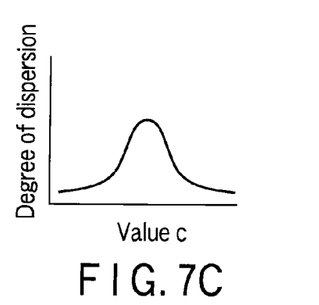
Figure 7D:
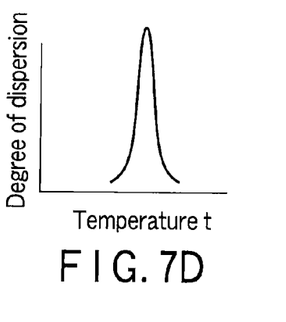
Figure 7E:
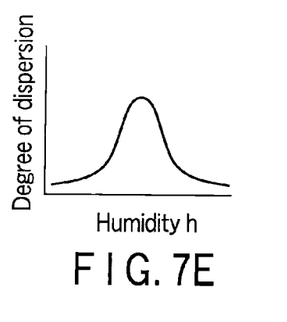
Figure 7F:
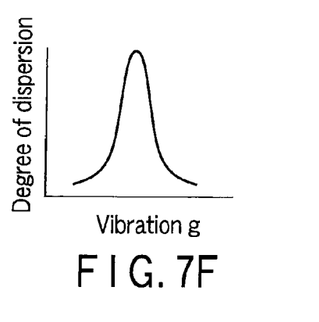

In the monitoring/diagnostic apparatus 1 of the apparatus-device pair No. 1, the PCA unit 12 is activated. The PCA unit 12 performs a PCA process, generating such a PCA result as shown in FIG. 6 (Step S4). At this point, the CPU unit 12 acquires the operation data items 20b to 20f about the other object devices of the same group, as well as the operation data item 20a about the object device paired with the monitoring/diagnostic apparatus 1. Using these data items 20a to 20f, the PCA unit 12 performs the PCA process.

From the CPA result output from the PCA unit 12, the agent management unit 8 determines whether the object device 2 seems to have a problem (Step S5). If the object device 2 seems to have a problem (if Yes in Step S5), the agent management unit 8 activates the diagnostic agent 72 incorporated in the agent execution unit 7 (Step S6). The diagnostic agent 72 executes a diagnostic algorithm for diagnosing the problem in detail, to determine the cause of the problem in the object device 2.

As seen from the PCT result shown in FIG. 6, the operation data items about the apparatus-device pairs Nos. 1 to 5 fall within a normal range, but the operation data item about the apparatus-device pair No. 6 falls in a range 25b. From this PCA result, the agent management unit 8 determines that the operation data collected by the apparatus 1 of the apparatus-device pair No. 6 may have a problem. Hence, the diagnostic agent 72 provided in the monitoring/diagnostic apparatus 1 of the apparatus-device pair No. 6 is activated, performing a problem-diagnosis process to identify the problem in the object device 2 associated with the apparatus 1.

The agent management unit 8 may be configured to activate the patrol data-collection agent 71 provided in the agent execution unit 7, when the operation-data abnormality monitoring unit 14 detects abnormality in the operation data. The operation-data abnormality monitoring unit 14 acquires the operation data from the connected-device operation database 5 and detects the abnormality in the operation data thus acquired.

In this embodiment configured as described above, each of the grouped monitoring/diagnostic apparatus 1 collects the operation data from the associated object device 2 and then performs the PCA process on the operation data items including the operating data item about itself. The monitoring/diagnostic apparatus 1 may detect, from the PCA result obtained in the PCA process, that the object device 2 may have a problem. In this case, the diagnostic agent 72 is activated to diagnose the object device 2 in order to identify the cause of the problem.

More specifically, the monitoring/diagnostic apparatuses 1, each monitoring the various components of, for example, an elevator installed at a specific position, are grouped and exchange information with one another through the network 10. The monitoring/diagnostic apparatuses 1 can therefore share the operation data items concerning the object devices 2.

So configured as described above and as shown in FIG. 1, each monitoring/diagnostic apparatus 1 can quickly detect that the associated object device 2 seems to have a problem because its operating state has drastically changed. Since the apparatus 1 can quickly detect a possible problem the associated object device 2, it can efficiently perform problem diagnosis. In each monitoring/diagnostic apparatus 1, only the diagnostic agent 72 associated with the object device 2 having a problem needs to be executed. This helps to reduce the storage capacity required of the memory used to enable the agents to operate in the agent execution unit 7.

If used in the monitoring/diagnostic system designed to monitor many object devices installed in remote places, the apparatuses 1 according to this embodiment can efficiently monitor and diagnose the object devices in accordance with the data items collected from the object devices, respectively, even if the operating states of the object devices have drastically changed.

Second Embodiment

FIGS. 7A to 7F are diagrams relating to a second embodiment of the present invention. In each monitoring/diagnostic apparatus 1 according this embodiment, the operation-data dispersion analysis unit 13 shown in FIG. 1 extracts operation data that is greatly dispersed, and the PCA process is performed in accordance with the operation data extracted by the unit 13.

The monitoring system according to this embodiment is identical to the system shown in FIG. 2 in configuration and operation. So is each monitoring/diagnostic apparatus 1 incorporated in the system is to the apparatus 1 shown in FIG. 1. Therefore, the system or each apparatus 1 will not be described in detail.

In each monitoring/diagnostic apparatus 1 according to this embodiment, the operation-data dispersion analysis unit 13 extracts greatly dispersed operation data from the operation data items shown in FIGS. 7A to 7F, including measured values a to c, temperature t, humidity h and vibration g. The operation data extracted is output to the PCT unit 12. As pointed out above, the intra-group operation-data database 16 accumulates operation data items collected by the patrol data-collection agent 71 provided in the agent execution unit 7. Using the operation data extracted by the operation-data dispersion analysis unit 13, the PCA unit 12 performs the PCA process, generating a PCA result.

As described above, only the operation data greatly dispersed is extracted in the present embodiment if the operation data collected by the patrol data-collection agent 71 is large in amount. This reduces the amount of the operation data from which to determine whether the object device 2 may have a problem. Using this operation unit, the PCA unit 12 can finish the PCA process within a shorter time than otherwise. As a result, any object device 2 that should be diagnosed for a problem can identified at high efficiency.

Third Embodiment

FIG. 8 is a block diagram showing the major components of a monitoring/diagnostic system according to a third embodiment of this invention. Each monitoring/diagnostic apparatus 1 provided in this system is identical in configuration to the system shown in FIG. 1. Therefore, the apparatus 1 according to this embodiment will not be described in detail, in terms of configuration and operation.

The remote monitoring/diagnostic system according to this embodiment has a monitoring center 34 connected to a network 10, in addition to the apparatus-device pairs Nos. 1 to 6, each having a grouped monitoring/diagnostic apparatuses 1 connected to the internet 10. As shown in FIG. 8, the monitoring center 34 has a device-component management database 35, a device-component management unit 36, a diagnostic agent database 37, a diagnostic-agent management unit 38, and a center communications unit 39. The monitoring center 34 further has a maintenance record database 40 and a maintenance assistance unit 41.

The remote monitoring/diagnostic system according to this embodiment will be described in respect to configuration and operation.

In the monitoring center 34, the device-component management unit 36 extracts the operation data about the grouped object devices 2 from the device-component management database 35 and distributes the operation data via the center communications unit 39, respectively, to the monitoring/diagnostic apparatuses 1 of the apparatus-device pairs Nos. 1 to 6. In each monitoring/diagnostic apparatuses 1, the operation data is stored into the group-information database 15. Therefore, each monitoring/diagnostic apparatuses 1 can acquire the device-configuration data about any object device 2 within the group.

The monitoring/diagnostic apparatus 1 of any one of the apparatus-device pairs Nos. 1 to 6 may make a request for a diagnostic agent. The request is supplied to the monitoring center 34. In the monitoring center 34, the diagnostic-agent management unit 38 acquires, in response to the request, a diagnostic agent from the diagnostic agent database 37. The center communications unit 39 distributes the diagnostic agent via the network 10 to the monitoring/diagnostic apparatus 1 that has made the request. In the monitoring/diagnostic apparatus 1, the diagnostic agent is set in the agent execution unit 7. Therefore, the monitoring/diagnostic apparatus 1 of any one of the apparatus-device pairs Nos. 1 to 6 can acquire a diagnostic agent from the monitoring center 34 if it has no diagnostic agents that can diagnose the problem detected by the PCA unit 12.

The maintenance assistance unit 41 of the monitoring center 34 is connected to a dedicated line 42, which in turn is connected to maintenance stations 43a, 43b and 43c. The maintenance assistance unit 41 can therefore give the maintenance stations 43a, 43b and 43c an inspection-point designation instruction for use in maintaining the object devices 2. The inspection-point designation instruction has been generated from the maintenance data stored in the maintenance record database 40 and the problem-diagnosis results generated by the monitoring/diagnostic apparatuses 1 of the apparatus-device pairs Nos. 1 to 6.

In this embodiment, the monitoring center 34 can distribute, at a time, the device-component information and the diagnostic agent to the grouped monitoring/diagnostic apparatuses 1 of the apparatus-device pairs Nos. 1 to 6. Further, the maintenance assistance unit 41 can give the maintenance stations 43a, 43b and 43c the inspection-point designation instruction for use in maintaining the object devices 2 being monitored, respectively, by the monitoring/diagnostic apparatuses 1 of the apparatus-device pairs Nos. 1 to 6. The persons at the maintenance stations 43a, 43b and 43c can therefore reliably kept informed of the information they needs to maintain the object devices 2 of the group to which he or she is assigned.

Fourth Embodiment

Figure 9:
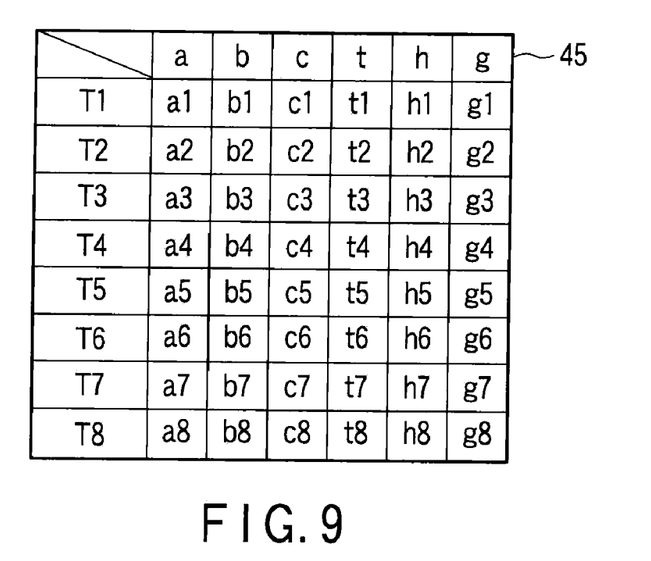
FIG. 9 is a table showing an operation-data history information about a fourth embodiment of this invention.
Figure 10:
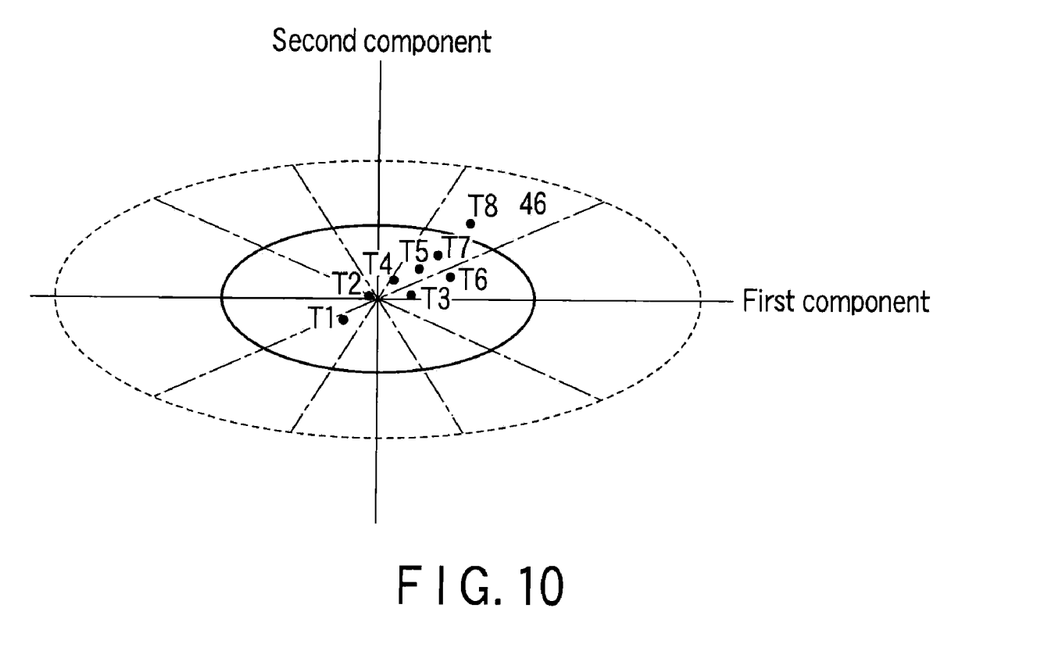
FIG. 10 is a diagram showing exemplary results of the PCA performed in the fourth embodiment.

FIGS. 9 and 10 are diagrams for explaining a fourth embodiment of the present invention. As shown in FIG. 1, each monitoring/diagnostic apparatus 1 according to this embodiment has an operation-data history database 17. The apparatus 1 and the system, both according to this embodiment, are similar to the apparatus 1 shown in FIG. 1 and the system shown in FIG. 2. Therefore, the apparatus 1 and the system will not be described in detail in terms of configuration or operation.

The operation-data history database 17 stores such operation-data history information 45 as illustrated in FIG. 19. The operation-data history information 45 has been acquired from the object device 2 via the device interface 4, at time T1, time T2, . . . , and at time 8. When activated, the PCA unit 12 acquires the operation-data history information 45 from the operation-data history database 17 and then performs the PCA process. Performing the PCA process, the PCA unit 12 generates such a PCA result as illustrated in FIG. 10.

In the present embodiment, the PCA unit 12 performs the PCA process, utilizing the operation-data history information 45 acquired in time sequence, and generates, for example, the PCA result illustrated in FIG. 10. The PCA may show that the operation data acquired at, for example, time t8, exists in a region 46b, indicating that the object device 2 may have a problem due to long use.

In this case, the agent management unit 8 activates the diagnostic agent 72. The object device 2 is thereby diagnosed for a possible problem. Each monitoring/diagnostic apparatus 1 can therefore quickly detect a problem in the object device 2, which has resulted from a long-time use of the object device 2. The problem detected can then be diagnosed for a possible problem.

In the monitoring center 34 of the system shown in FIG. 8, the diagnostic-agent management unit 38 can distribute, via the center communications unit 39, a diagnostic agent indicating a problem due to long use, which the PCA unit 12 has detected, to the apparatuses 1 of the apparatus-device pairs Nos. 1 to 6.

Fifth Embodiment

Figure 11:
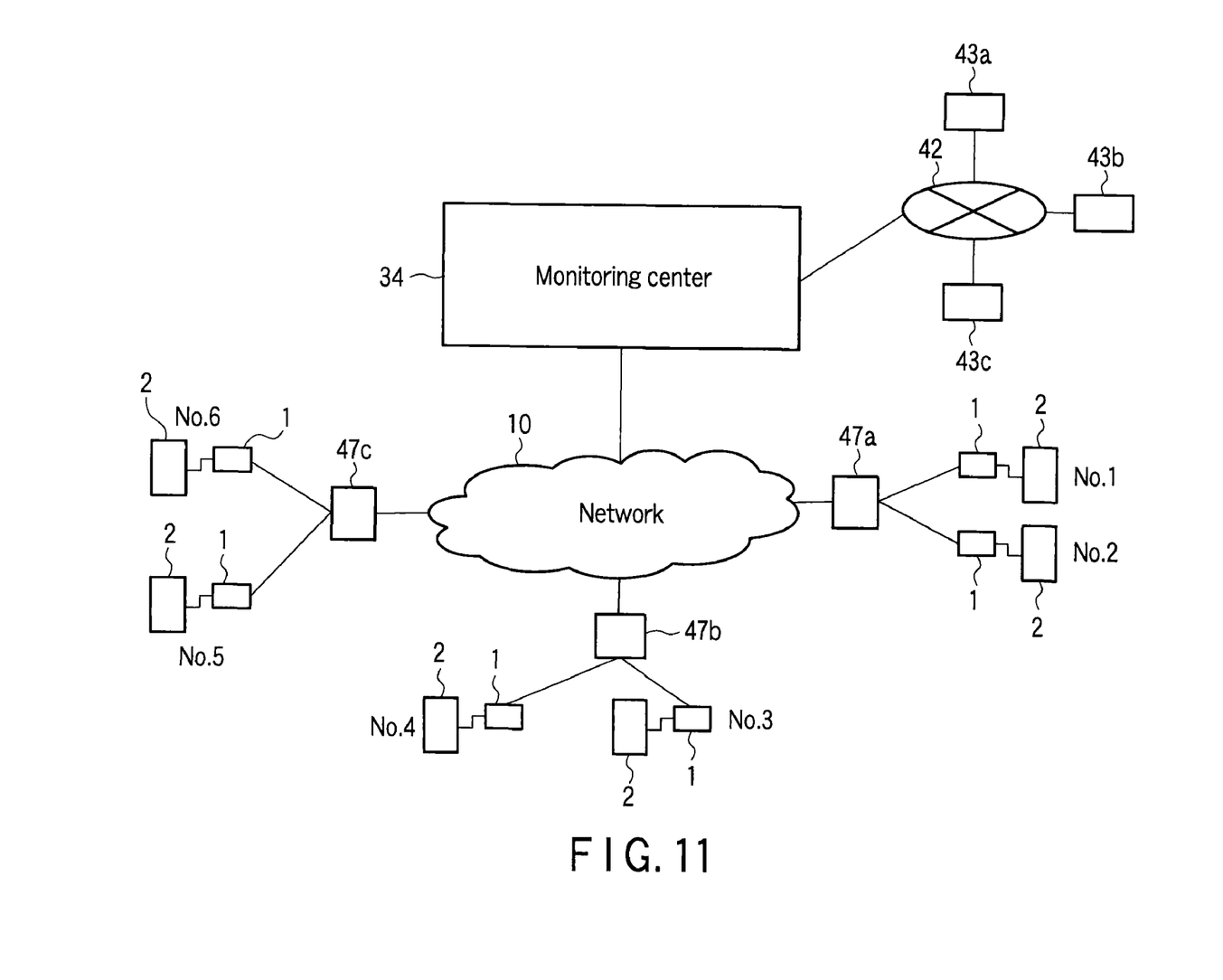
FIG. 11 is a block diagram showing the major components of a monitoring/diagnostic system according to a fifth embodiment of the present invention.

FIG. 11 is a block diagram showing the major components of a monitoring/diagnostic system according to a fifth embodiment of the present invention. Each monitoring/diagnostic apparatus 1 is identical in configuration to the apparatus 1 shown in FIG. 1, and the monitoring center 34 is identical in configuration to the center 34 shown in FIG. 8. Therefore, the monitoring/diagnostic apparatuses 1 and the monitoring center 34 will not be described in detail in terms of configuration or operation.

In the system according to this embodiment, the grouped monitoring/diagnostic apparatuses 1 of the apparatus-device pairs Nos. 1 to 6 are divided into sub-groups, each consisting of, for example, two apparatuses. The sub-groups of apparatuses 1 are connected to the network by servers 47a, 47b and 47c, respectively.

More precisely, the monitoring/diagnostic apparatuses 1 of the apparatus-device pairs Nos. 1 and 2 are connected by the server 47a to the network 10, the monitoring/diagnostic apparatuses 1 of the apparatus-device pairs Nos. 3 and 4 are connected by the server 47b to the network 10, and the monitoring/diagnostic apparatuses 1 of the apparatus-device pairs Nos. 5 and 6 are connected by the server 47c to the network 10.

As shown in FIG. 8, each of the servers 47a, 47b and 47c has components equivalent to the device-component management database 35, device-component management unit 36, diagnostic agent database 37 and diagnostic-agent management unit 38, all incorporated in the monitoring center 34 as is illustrated in FIG. 8. The components of each server will be described using the same reference numbers for the sake of convenience.

In each of the servers 47a, 47b and 47c used in the system according to the present embodiment, the device-component management unit 36 extracts the device-component information items about the two associated monitoring/diagnostic apparatuses 1 from the device-component management database 35. The device-component information items acquired are distributed to the two associated monitoring/diagnostic apparatuses 1. To be more specific, the device-component information items acquired in the server 47a are distributed to the monitoring/diagnostic apparatuses 1 of the apparatus-device pairs Nos. 1 and 2; the device-component information items acquired in the server 47b are distributed to the monitoring/diagnostic apparatuses 1 of the apparatus-device pairs Nos. 3 and 4; and the device-component information items acquired in the server 47c are distributed to the monitoring/diagnostic apparatuses 1 of the apparatus-device pairs Nos. 5 and 6.

In each the servers 47a, 47b and 47c, the diagnostic-agent management unit 38 extracts the diagnostic agent from the diagnostic agent database 37 and distributes the diagnostic agent to the two associated monitoring/diagnostic apparatuses 1 (i.e., the monitoring/diagnostic apparatuses 1 of the apparatus-device pairs Nos. 1 and 2, Nos. 3 and 4 or Nos. 5 and 6). In each monitoring/diagnostic apparatus 1, the diagnostic agent thus distributed is set in the agent execution unit 7. Thus, each monitoring/diagnostic apparatus 1 can acquire the diagnostic agent from the associated server (47a, 47b or 47c) if no diagnostic agent indicating the problem detected by the PCA unit 12.

In the monitoring center 34, the maintenance assistance unit 41 acquires the result of problem diagnosis via the servers 47a, 47b and 47c from the monitoring/diagnostic apparatuses 1 of the apparatus-device pairs Nos. 1 to 6. From the result of problem diagnosis and the maintenance data stored in the maintenance record database 40, the maintenance assistance unit 41 determines inspection points where each device 2 should be inspected. The data designating the inspection points is supplied to the maintenance stations 43a, 43b and 43c through the dedicated line 42.

Thus, in this embodiment, the process of distributing the device-component information and the diagnostic agent to the severs 47a, 47b and 47c, not altogether to the monitoring center 34. This helps reduce the operation load imposed on the monitoring center 34.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system for monitoring and diagnosing object devices grouped in accordance with model or series, comprising:
   monitoring/diagnostic apparatuses associated with the object devices, respectively, each having a diagnostic module for diagnosing a problem in the associated object device, a storage module configured to store intra-group operation data about the object devices, and an agent management module for managing agents;
   a network configured to achieve data communication between the monitoring/diagnostic apparatuses; and
   an agent system in which any agent transmitted from each of the monitoring/diagnostic apparatuses via the network circulates in the group of object devices to collect the intra-group operation data.

2. The system according to claim 1, further comprising:
   an information distribution module configured to distribute device-component information about the grouped object devices via the network to the monitoring/diagnostic apparatuses; and
   an agent distributing module configured to distribute necessary agents to the monitoring/diagnostic apparatuses.

3. The system according to claim 1, further comprising a notification module configured to generate inspection-point data from a result of a problem-diagnosis process and maintenance data, both acquired from each monitoring/diagnostic apparatus, and configured to supply the inspection-point data to maintenance stations provided for the grouped object devices, respectively.

4. The system according to claim 1, wherein the agent management module activates a diagnostic agent for diagnosing a problem in detail, when the diagnostic module detects that the object device has a problem due to long use.

5. The system according to claim 4, further comprising a module configured to distribute the diagnostic agent to the monitoring/diagnostic apparatus via the network when the diagnostic module detects that the object device has a problem due to long use.

6. The system according to claim 1, wherein the grouped monitoring/diagnostic apparatuses are divided into sub-groups, and servers are provided for the sub-groups, wherein each server has:
   a module configured to distribute the device-component information to the monitoring/diagnostic apparatuses of each sub-group; and
   a module configured to distribute necessary agents to the monitoring/diagnostic apparatuses of each sub-group.

* * * * *